Jan. 9, 1940. A. MAIER 2,186,536
SHIFT MECHANISM FOR MOTOR VEHICLE TRANSMISSIONS
Filed May 16, 1936  2 Sheets-Sheet 2
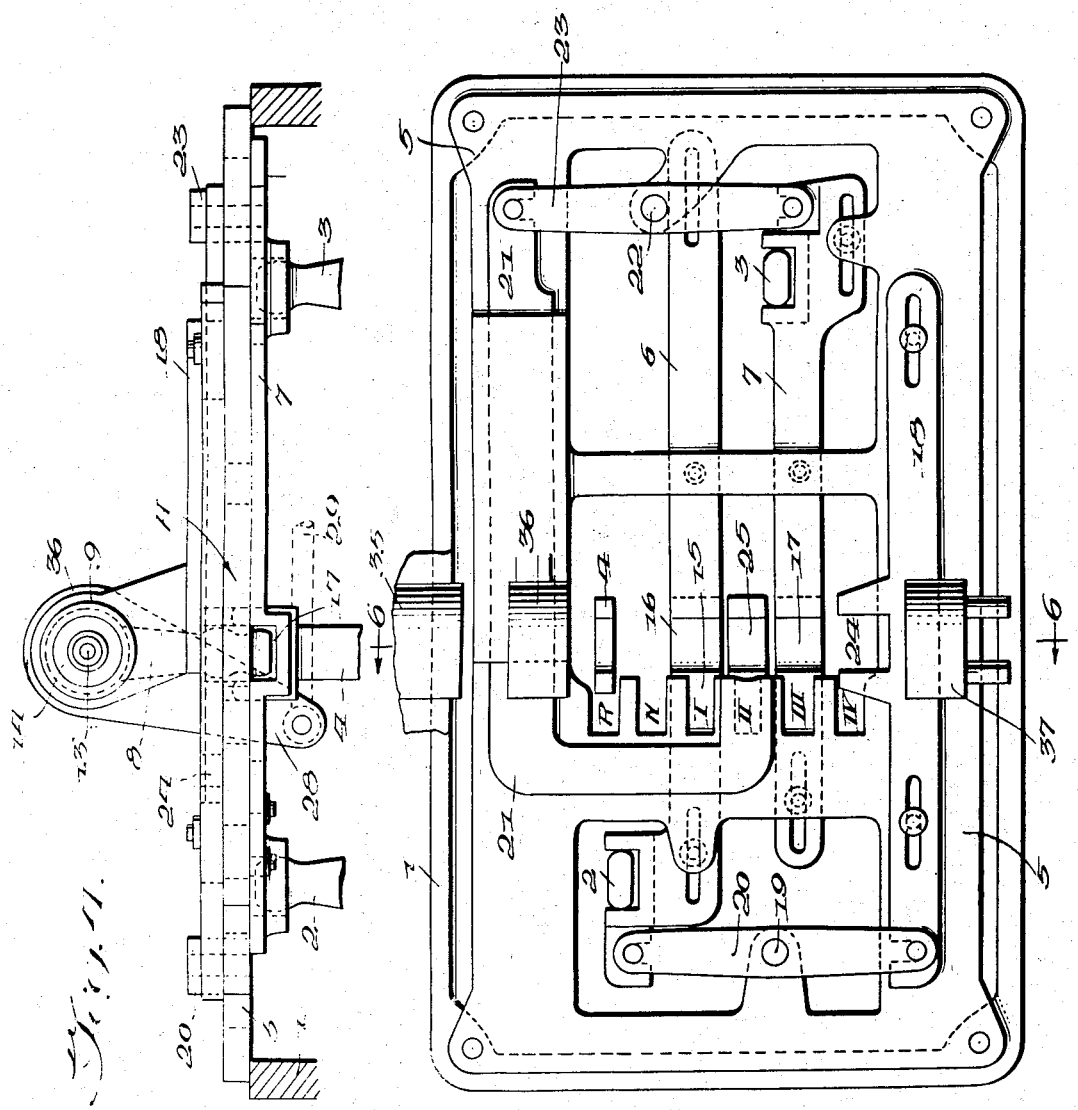
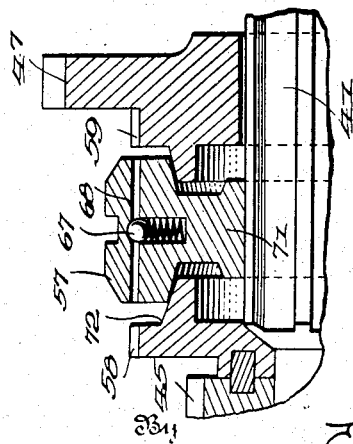
Inventor
ALBERT MAIER,
Edmund H. Parry Jr.

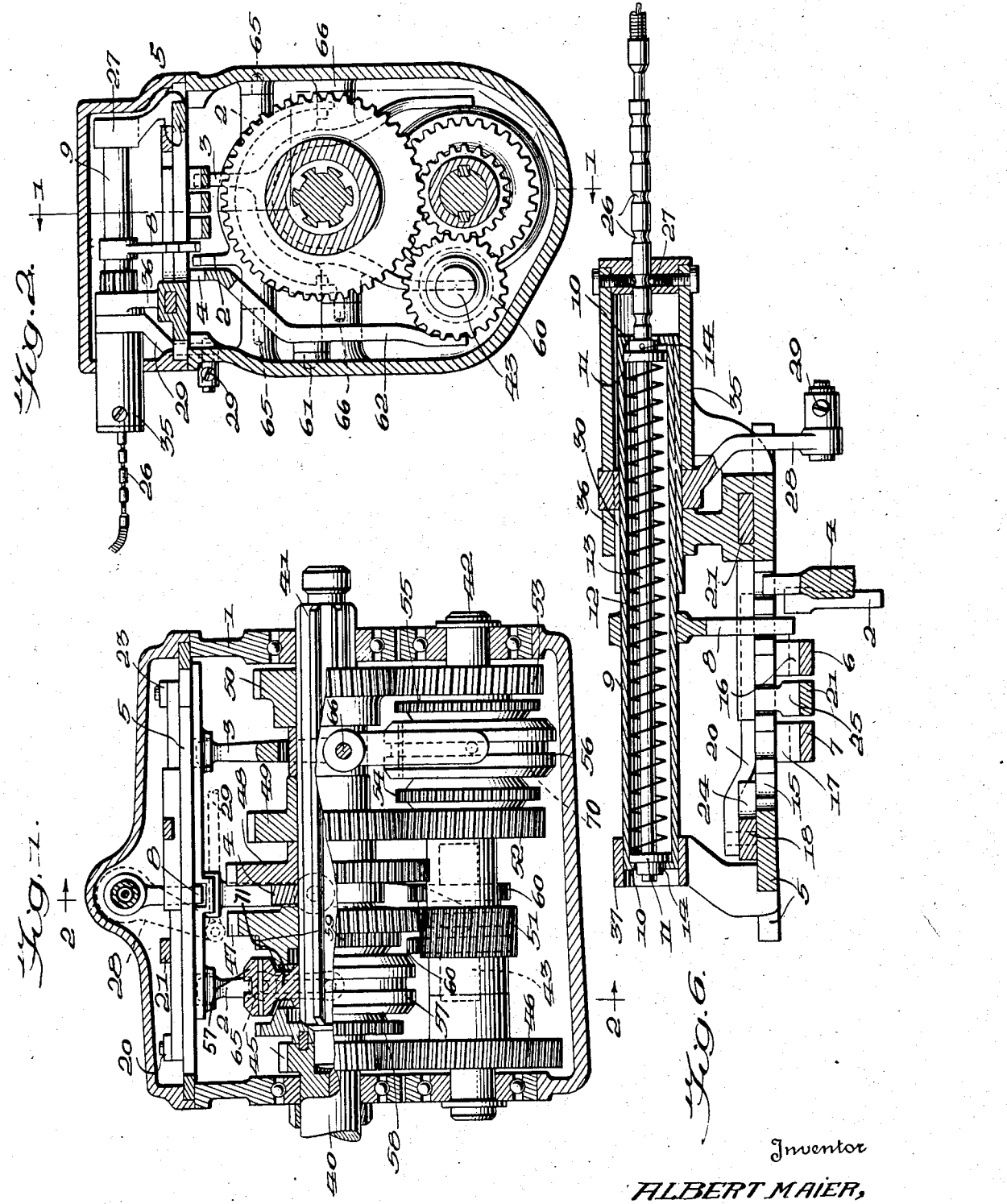

Patented Jan. 9, 1940

2,186,536

UNITED STATES PATENT OFFICE 2,186,536

SHIFT MECHANISM FOR MOTOR VEHICLE TRANSMISSIONS

Albert Maier, Friedrichshafen, Germany, assignor to Zahnradfabrik Friedrichshafen Aktiengesellschaft, Friedrichshafen Bodensee, Germany Application May 16, 1936, Serial No. 80,200
In Germany June 26, 1935

2 Claims. (Cl. 74—334)

This invention relates to improvements in shift mechanisms for motor vehicle multiple-speed transmissions wherein engagement of the various gear speeds is effected through reversely operating elements which are operated through a series of shift bars.

The object of the present construction is to simplify the shift mechanism. The shifting picture should be presented to the driver in its simplest form, so that it is easily impressed upon his mind and precludes any error in shifting.

One of the essential features of the invention consists in the arrangement of the shift path of the actuating lever, common to all of the shift bars, and the arrangement of the bars for the different speeds, in such manner that the actuating lever is moved progressively in the same direction in going from the lowest to the highest speed.

Another feature of the invention resides in the provision of a guide member having shift notches above the individual shift bars in continuous succession and adjacent to each other, from the lowest to the highest speed and into which notches the actuating lever moves when operating the respective shift bars in one direction. Together with the shift bars are provided auxiliary shift bars, and so connected therewith by means of reversing members that the common actuating lever operates main shift bars in one direction by direct engagement therewith and operate such bars in the opposite direction by moving the auxiliary shift bars in the first direction.

A further primary feature of the invention is the provision of a simple unitary operator for the shift bar actuating lever which commonly serves as gear selector and as a gear shift operator, functioning both to shift the lever into selective engagement with the various shift bars by movement in a uni-directional path and causing the lever at different points of the path to operate the different shift bars. Separate control means are provided for causing the unitary operator to perform its several functions, it being contemplated that the gear selection be directly controlled by the driver and that the actual shifting of the gears through the operator be otherwise initiated as through the working of the clutch. Other features will become apparent from the following description and the drawings. The drawings show an exemplary embodiment of the invention, wherein:

Fig. 1 is a vertical longitudinal section on line I—I (Fig. 2) of a drive provided with the shift mechanism of the invention.

Fig. 2 is a cross section on line II—II (Fig. 1).

Fig. 3 is a somewhat enlarged detail of Fig. 1.

Figs. 4, 5 and 6 show the shift mechanism per se on enlarged scale.

Fig. 4 is a longitudinal elevation.

Fig. 5 shows the shift mechanism from above, whereon the actuating lever common to all shift movements and the details of the speed selection are omitted for greater clearness.

Fig. 6 is a section on line VI—VI (Fig. 5) in which the speed pre-selective elements are shown in longitudinal section.

It is assumed that the shift mechanism is to be mounted on the housing 1 of a drive, in which there are the levers 2, 3 and 4 for directly actuating the shift members involved and whereby the said levers are to be moved individually or also together in opposite directions. This shift mechanism can be built, for example in a speed change (transmission) drive with four speeds forward and a reverse. The drive shown here has a drive shaft 40 to be coupled with the vehicle motor and coaxial therewith a driven shaft 41, together with an auxiliary shaft 42 and the reverse shaft 43. Mounted rigidly on shaft 40 is the gear 45 which, with gear 46 keyed on the auxiliary shaft 42, serves as the so-called constant transmission. Shaft 41 carries the various other gears, that is, the loose gear 47 of first speed and also the rigidly mounted gears 48, 49 and 50. The gears 49 and 50 serve for the 2d and 3d speeds. Engaging with gear 47 is gear 51 rigidly mounted on the auxiliary shaft 42. Counter-gears 52 and 53 meshing respectively with gears 49 and 50 are disposed idly on auxiliary shaft 42, although provided with clutch teeth 54 and 55 which individually couple such gears to their shaft under engagement with a toothed clutch sleeve 56 splined to slide on its supporting member 70 which in turn is slidably keyed on the shaft by means of grooves and lugs. Provided between the shaft 40 and gear 47 is a toothed clutch sleeve 57 slidable on and splined to slidable member 71 keyed to shaft 41 and which, according to its movement, can be engaged with the coupling teeth 58 of the wheel 46 or with coupling teeth 59 of the wheel 47 mounted on the driven shaft 41. For reverse speed there is provided on the reverse shaft 43 a double gear 60 having an annular groove which receives the gear shift lever 62 pivotally supported by the pin 61.

The shift lever 2 is supported by pin 65 and engages with an annular groove of the coupling sleeve 57. Shift lever 3 is supported by pin 66 and engages the coupling sleeve 56. Provided on the supporting members 70 and 71 of the coupling sleeves 56 and 57 as well as on the oppositely positioned parts to be coupled are friction surfaces 72 which serve in the usual manner for synchronising before the final engagement of the claw tooth clutch, and the coupling sleeves consist actually each of two interfitted parts above referred to, that is, 56 and 70, and 57 and 71, which are held together in normal inoperative position by the locking members 67. The outer part of such sleeves is made axially slidable on the inner part through teeth 68, so that, in known manner, on moving the coupling sleeves toward one side or the other, first synchronisation is obtained through the friction surfaces and thereupon final engagement between the coupling teeth on the sleeve and teeth 58 or 59 of the parts to be coupled takes place.

The shift mechanism comprises a series of shift bars or slides selectively operable to produce different gear selections through the instrumentality of a common actuating lever. A supporting member is provided for the actuating lever movable in one direction to bring the lever into operative relation with a particular slide and having an independent movement for causing the lever to actuate the slide. In the transmission illustrated, with four forward speeds and a reverse, speeds I and IV are effected through lever 2 and speeds II and III through lever 3, through movement of said levers in opposite directions.

The invention is primarily designed to be mounted on the drive housing 1 of the transmission and comprises a frame 5 in which are mounted a series of slide bars including bars 6 and 7 operatively connected with the respective levers 2 and 3. An actuating lever 8 is provided, hereafter to be described in detail, for actuating the different slide bars. Such lever is swung only in one direction for the purpose of connecting in the individual speeds, and for such purpose the various slide bars selectively acted upon by the lever are also moved in a single direction as indicated by the arrow A in Figure 4. The actuating lever and the individual slides all move in the same opposite direction to release the gears. For the reverse speed, a lever 4 may be employed in lieu of a slide such as 6 and 7, the same being acted upon by the actuating lever 8 in the same manner just explained.

Both shift bars 6 and 7 have suitable notches 16 and 17 into which the actuating lever 8 may be carried. Shift bar 6 has an auxiliary bar or slide 18 which is coordinated with the bar 6 by means of a double lever 20 oscillatable about a pin 19. In similar manner bar 7 is provided with an auxiliary bar or slide 21 and connected therewith by means of a double lever 23 oscillatable about pin 22. The auxiliary bar 18 has the notch 24 for the reception of the lever 8 and auxiliary bar 21 is provided with a notch 25 for the same purpose.

Extending transversely to bars 6, 7 and auxiliary bars 18 and 21 is a part of the frame 5 with the shift notches 15, which are arranged according to the shift positions, for example on Fig. 5 for the speeds designated I, II, III and IV. N designates idling and R reverse. In shifting the lever 8 is first moved transversely of the shift bars and set to the individual shift notches, then forced in a longitudinal direction to actuate the bars at the notches. When swung back to release a particular gear speed lever 8 takes the position as shown on Fig. 4.

In adjusting it use is made, for example, of a pre-selective device, as shown principally on Fig. 6. Lever 8 is united with a sleeve 9 which extends across the main and auxiliary shift bars and which receives a spring 12 loosely engaged between specially formed end margins 10 and discs 11. An actuating rod 13 extends through spring 12 upon which are slidably mounted discs 11 against which bear the ends of the spring. Fixed to rod 13 are stop members 14 which limits the movement of the discs. When rod 13 is moved to the left the left disc 11 will be held by the marginal members 10 while the rod slides therethrough. At such time the right hand stop 14 acts against the right disc 11, moving the same to the left and causing the spring to be compressed. The conditions are reversed when rod 13 is moved to the right. Rod 13 is provided at an end with grooves 26 of equal number and distance apart as the shift notches 15 of said transverse frame portion. Connected to rod 13 is a suitable Bowden member or the like by means of which the rod can be moved from the driver's seat. Engageable with the respective grooves are locking members, for example spring-actuated balls 27, which are disposed in a bearing part 35 rigid on frame 5 and which, together with the bearing parts 36 and 37, serves as a guide for sleeve 9. In order to swing out sleeve 9 and the lever 8 connected therewith, use is made of the lever 28 to which an actuating rod 29 is connected, which may be connected with the clutch lever of the vehicle. Lever 28 is grooved in its bore encompassing sleeve 9 and sleeve 9 has corresponding wedges 30, so that the longitudinal movement of sleeve 9, its rotation and therewith the swinging out of lever 8 may take place by means of lever 28 regardless. Fig. 6 shows lever 8 in the position which corresponds to idling.

It will be understood from Figs. 4, 5, and 6 that the sleeve 9 performs a dual function. Through movement of the sleeve in its uni-directional path across the various shift bars actuating lever 8 is moved into position opposite one of the notches 15 in the frame. In any such position the lever 8 is put in operative relation to engage the shift bar for a particular speed. Adjustment of the position of the sleeve 9 in its path is controlled by the driver through rod 13. While the sleeve 9 is movable only along one path, it further serves to move actuating lever 8 in a direction longitudinally of the frame to move the shift bars through rotation within its supporting mounting. As previously explained rotation of the sleeve 9 and actuation of lever 8 is effected through arm 28, the latter preferably being connected with the clutch pedal of the vehicle. When the clutch is engaged the lever 8 will be positioned in one of the notches, and when the clutch pedal is depressed the lever 8 will be swung out of its particular notch so that the same may be shifted transversely through longitudinal movement of sleeve 9 by the driver.

The operation of the shift mechanism with particular reference to the illustrative transmission here shown can be briefly summarized. Assuming that the vehicle travels at first speed, the lever 8 will be in notch I, and shift bar 6 is shifted to the left, in Fig. 5. In such position lever 2 will similarly be shifted to the left, causing clutch sleeve 57 to engage teeth 59 to secure gear 47 to shaft 41. The drive will then be from shaft 40 through gear 45 to gear 46 on the counter-shaft thence through gear 51 to gear 47, the latter rotating the driven shaft 41.

If it is desired to pass to second speed rod 13 is shifted from notch 26 corresponding to first speed to the next notch 26 corresponding to second speed. In this movement spring 12 is compressed for lever 8 is still in notch I of the frame and sleeve 9 has therefore not yet shifted longitudinally. When lever 28 is actuated to rotate sleeve 9 and release lever 8 from notch I, lever 8 is then carried by the relaxing spring 12 opposite notch II and then enters this notch as lever 28 is moved in the opposite direction. In this operation lever 8 moves auxiliary shift bar 21 to the left, thereby, through the reversing arm 23, causing the main shift bar 7 and lever 3 to move to the right. In such position of lever 3, driving connection is made between shafts 40 and 41 through gears 45, 46, and gears 52, 49.

To attain third speed, lever 8 is operated in a similar manner, and upon entering notch III moves main shift bar 7 and lever 3 to the left. In such position of lever 3 clutch 56 meshes with teeth 55 to secure gear 53 to the counter-shaft. Shaft 41 is then driven through gears 45, 46, and gear 53, 50.

In going into fourth speed actuating lever 8 enters notch IV, moving auxiliary shift bar 18 to the left, this bar, through lever 20, serving to move main shaft bar 6 and lever 2 to the right. In this position of lever 2 clutch 57 meshes with teeth 58, effecting a direct drive between shafts 40 and 41.

When it is desired to use the reversed speed actuating lever 8 is shifted into notch R, and in such movement shifts lever 4 to the left. The counter-shaft, driven through gear 45, 46, drives the reverse shaft 43 through gear 51 and double gear 60. Operation of the lever causes one portion of gear 60 to mesh with gear 48 which is keyed to the driven shaft 41.

By reference to Fig. 5 it will be observed that the various main and auxiliary shift bars are closely spaced together so that only a slight crosswise movement of the actuating lever 8 is required in shifting from engagement with one shift bar to another. Between shift bar 6 and reverse lever 4 however a substantial space is left opposite notch N so that lever 8 may freely enter notch N without engaging any of the operative parts in its neutral position.

It will now be clear that pre-selection of speed is attained by movement of actuating lever 8 in a fixed straight line path under longitudinal moves of sleeve 9, adjacent the series of notches, from the lowest to the highest speed in continuous succession. By rotation of sleeve 8 in the direction of the arrow A in Fig. 4 lever 8 is moved transversely of the fixed selection path to actuate one or another of the gear shift bars and thus effect a particular speed drive between certain of the gears of the transmission. Withdrawal of the lever 8 from the various notches by movement in a direction opposite to the arrow releases the particular transmission drive, and any other speed may be selected upon movement of sleeve 8 in its path. It will further be observed that while gear levers 2 and 3 must be thrown in opposite directions to attain different speed drives, the assembly of the main and auxiliary shift bars is such that driving engagement for every speed is effective through movement of the actuating lever 8 in a single direction.

What I claim is:

1. Shift mechanism for gear systems comprising a plurality of gear shifting slides arranged side by side, a frame, a hollow shaft member supported above the slides by bearings on the frame and extending crosswise of the slides, said member being slidable lengthwise in the frame bearings in a fixed uni-directional path and also being rotatably in its bearings, and a depending actuating arm on said shaft adapted to be brought selectively into engagement with the individual slides under movement of the shaft member in its longitudinal path, said actuating arm upon rotation of the shaft member in one direction being operable to shift each of the slides in a common direction and being operative upon reverse rotation of the shaft member to shift each of the slides in the other direction, spring means in said hollow shaft member for moving the shaft member lengthwise, and a speed selective control member adapted to be set to different positions to adjustably compress the spring means, the spring means upon expanding from its compressed condition serving to move the shaft to different slide engaging positions of the actuating arm in dependency on the amount of compression produced by the control member.

2. Shift mechanism for gear systems comprising a pair of gear shifting slides arranged side by side, a reversing arm interconnecting said pair of slides and causing either to move in a direction opposite to the direction of movement of the other, a further pair of reversely operating gear shifting slides interconnected by a reversing arm and positioned in spaced apart relation on opposite sides of the first pair of slides, separate members for connecting the respective pairs of slides with the gear system and being operable in two directions to shift the gears of the system, an actuating lever shiftable in a path transverse of the slides into operative relation with any of the slides, an operating member extending crosswise of the slides supporting said actuating lever, means for moving said operating member longitudinally to shift the lever in its speed selecting path, and means for turning the operating member to cause the actuating lever to shift the slides, said lever in its actuating shift in one direction, through the respective slides of the reversely operating slide pairs, serving to operate either of the gear connecting members in either of two directions.

ALBERT MAIER.